United States Patent [19]
Westcott

[11] 3,731,946
[45] May 8, 1973

[54] TORSIONALLY FLEXIBLE HITCH

[76] Inventor: Orville H. Westcott, 1115 West 10th Street, Sioux Falls, S. Dak. 57104

[22] Filed: May 10, 1971

[21] Appl. No.: 141,543

[52] U.S. Cl. ................................. 280/24, 280/494
[51] Int. Cl. ............................................. B62b 13/00
[58] Field of Search.................... 280/24, 15, 18, 493, 280/400; 180/5

[56] References Cited

UNITED STATES PATENTS

| 3,464,735 | 9/1969 | Smith | 280/15 X |
| 3,560,013 | 2/1971 | Lee | 280/24 |
| 2,432,253 | 12/1947 | Schaeffer | 280/116 |

FOREIGN PATENTS OR APPLICATIONS

| 83,417 | 1/1954 | Norway | 280/24 |

Primary Examiner—Leo Friaglia
Attorney—Lucas J. De Koster

[57] ABSTRACT

A tow bar for a toboggan or the like for use in connection with a snowmobile. The bar is flat and resilient whereby flexure is permitted, but the toboggan is restrained from tipping over.

2 Claims, 2 Drawing Figures

PATENTED MAY 8 1973 3,731,946

INVENTOR.
Orville H. Westcott
BY Lucas J. D. Foster
His Att'y.

TORSIONALLY FLEXIBLE HITCH

BACKGROUND AND SUMMARY OF THE INVENTION

This invention pertains to towing devices and more particularly to a tow bar adapted to connect a sled or toboggan to a snowmobile or similar towing device.

With the advent of the snowmobile, a device for towing sleds, toboggans and the like became practical. However, the relatively high speed made stability of such towed devices on rough terrain a real problem. Frequently the sled tipped over. Also, when only a rope was used, the sled did not stop as quickly as the towing device, and then the sled collided with the rear part of the towing device, or ran loose completely out of control.

Rigid bars prevented the rear end collisions, but created other problems. Particularly in rougher terrain, the rigid bar caused the sled to tip whenever the snowmobile tilted. The structural strain on the bar and on the sled is obvious.

By my device I provide a tow bar rigid enough to prevent the rear end collision yet flexible enough to allow considerable relative rolling motion. Still, the sled is restrained from tipping unless the snowmobile tips. Further, complete control of the sled is maintained at all times.

FIGURES

DESCRIPTION

Figure 1:
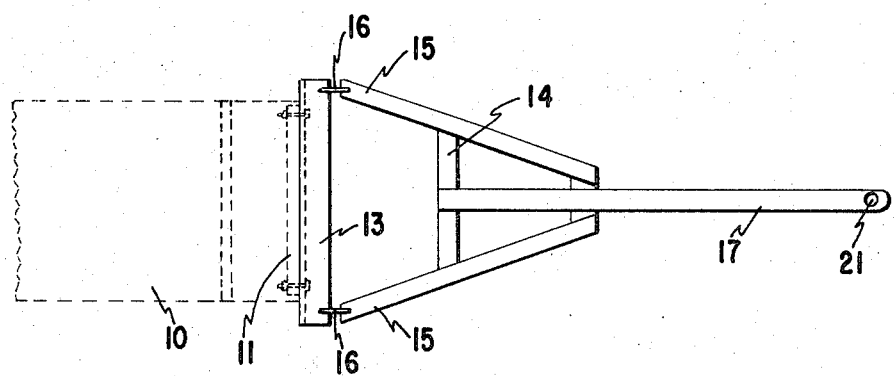
FIG. 1 is a top plan view of my device.
Figure 2:
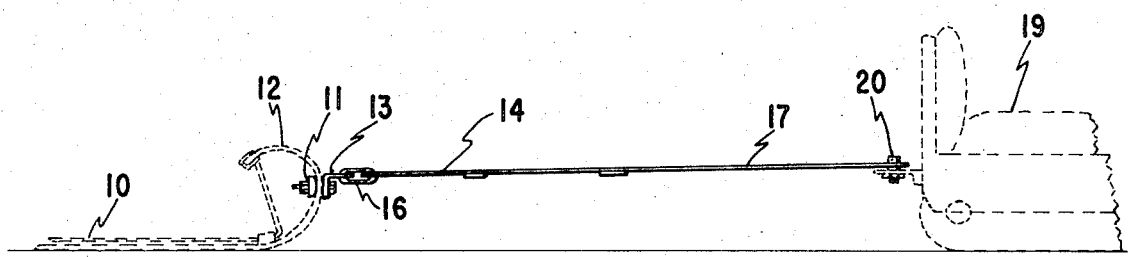
FIG. 2 is a side elevational view of the device connected between a toboggan and a snowmobile.

Briefly my device comprises a tow bar composed of flat members being somewhat resilient under torsional stress, and flexibly connected to the towed device.

More specifically and referring to the drawings, my device is illustrated as towing a toboggan 10. The connecting portion on the toboggan includes a bar 11 extending transversely of the curl 12 of the toboggan. An angle shaped piece 13 on the front of the curl 12 is bolted to the bar 11 thereby clamping the toboggan portion between the two pieces.

The tow bar itself is formed of an A-shaped framework 14 having legs 15 spread apart to about the width of the toboggan. These legs are connected to the angle member 13 by links 16 loosely disposed in holes in the legs and the angle member. This type of connection allows for free twisting motion between the frame 14 and the toboggan, but only for a relatively small amount of motion. Such motion frequently arises when either the snowmobile or the sled encounters a lump of snow or other relatively small irregularity.

The tongue 17 extending from the A-frame 14 is fairly long and is formed of a flat piece of resilient material. I have found that a flat iron or steel strap approximately one-eighth inch thick and 1 to 1½ inches wide works quite satisfactorily for a small unit. Other larger sizes may be necessary for larger towing devices and sleds.

The connection between the snowmobile 19 and the tongue 17 is by means of the customary pin 20 on the snowmobile extending through a hole 21 in the tongue. The clearance between the pin and the walls of the hole should be small — of the order of a smooth to loose fit, in order that the tongue may be restrained at this end. It will be apparent that in the place of the hole 21 in the tongue, a ring could be fixed to the end of the tongue, and the same sort of fit used with such a device.

It will be apparent that because of its shape, the tongue will allow some relative twisting between the sled and the snowmobile such as might be encountered on the edges of snow drifts or the like. Under these circumstances, there would be increasing pressure to right the sled as it moved farther from the position in the same plane as the towing device. Thus there is always a stabilizing tendency between the two units while allowing considerable relative movement as may be desired.

I claim:

1. For connecting a towed device to a towing device, connecting means comprising a flat elongated means including a bar having a ratio of width to thickness of the approximate order of at least 8:1; means connecting said elongated means to said towing device to resist twisting motion therebetween, and means connecting said elongated means to said towed device so that twisting movement of said towed device relative to said towing device is resiliently resisted by the resilient of said bar, said means connecting the elongated means to the towed device including flexible means to allow limited free movement therebetween, said flexible means including links looped between the elongated means and the towed means, said connecting means being attached to said towed device and extending laterally thereof, said elongated means including an A-shaped framework adjacent to said connecting means, said links being loosely engaged between the legs of said A-shaped frame and said connecting means.

2. The device of claim 1 in which said bar extends from the apex of said A-shaped frame towards the towing device and is formed to provide an opening at the end opposite to said A-shaped frame, pin means on said towing device adapted to fit into said opening.

* * * * *